W. POHL.
WORM GEAR.
APPLICATION FILED SEPT. 4, 1920.
1,385,641.
Patented July 26, 1921.
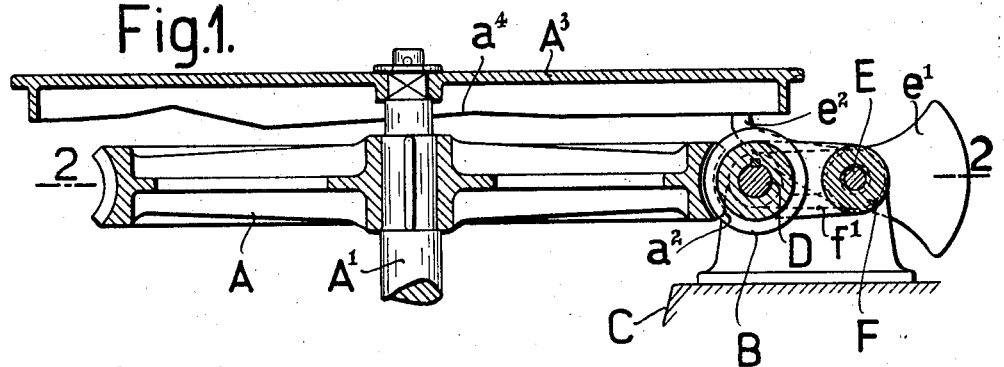
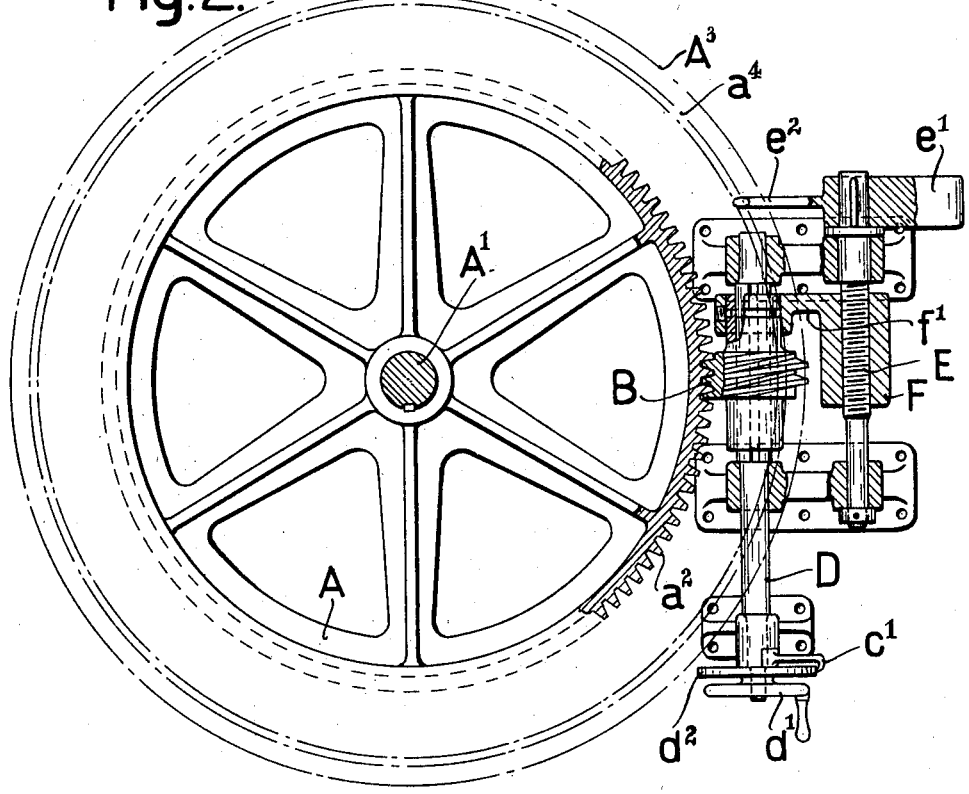
Inventor
Wilhelm Pohl
By Knight Bros.
Attys

UNITED STATES PATENT OFFICE.

WILHELM POHL, OF ESSEN, GERMANY, ASSIGNOR TO FRIED. KRUPP AKTIEN-GESELLSCHAFT, OF ESSEN-ON-THE-RUHR, GERMANY.

WORM-GEAR.

1,385,641.          Specification of Letters Patent.    Patented July 26, 1921.

Application filed September 4, 1920. Serial No. 408,387.

*To all whom it may concern:*

Be it known that I, WILHELM POHL, residing at Essen, Germany, a citizen of the German Republic, have invented a certain new and useful Improvement in Worm-Gears, for which I have filed applications in Germany, November 11, 1918; Austria, June 7, 1920; France, July 8, 1920; Belgium, July 7, 1920; Sweden, June 17, 1920, Switzerland, June 7, 1920; Great Britain, July 2, 1920, and in Czechoslovakia, June 9, 1920, of which the following is a specification.

The present invention relates to a worm gear with an arrangement for automatically compensating the inequalities which are produced in the transmission of the rotation by the inaccuracies in the pitch of the worm wheel. Worm gears of this kind may be used with advantage on gear wheel cutting machines, for example, in order to move the gear wheel which is to be cut always by the exact amount of its pitch after the completion of one of the gaps between the teeth.

The invention will be described with reference to the accompanying drawings in which—

Figure 1 is a section of the adjusting apparatus taken at right angles to the axis of rotation of the worm, Fig. 2 is a section on the line 2—2 of Fig. 1, looking from above.

The adjusting apparatus has a worm wheel A, which is mounted on a shaft $A^1$ and is intended to rotate the gear wheel which is to be cut (not shown) by the exact amount of its pitch. With the teeth $a^2$ of the worm wheel gears a worm B which is rotatable with and movable longitudinally on, the driving shaft D of the adjusting apparatus mounted on the frame C. This shaft D carries a hand wheel $d^1$ (see Fig. 2) and a disk $d^2$ provided with graduations on its periphery by the position of which relatively to a pointer $c^1$ fixed on a bearing of the shaft D the angle of rotation of the shaft is determined. The worm B is moved along the shaft D by a screw spindle E, which is mounted to rotate alongside the shaft D but cannot move longitudinally on the frame C. The screw spindle is inclosed in a screw-threaded sleeve F which gears with the screw threaded part of the spindle and has an arm $f^1$ which is connected to the worm B so that the latter can rotate but that the arm $f^1$ cannot move longitudinally with relation to the worm B, and that the worm B can only move in an axial direction together with the screw-threaded sleeve F which is prevented from rotating by the arm $f^1$. On the screw spindle E is mounted a two-armed lever one arm of which $e^1$ is constructed so as to form a counterweighted lever and the other arm $e^2$ of which is pressed constantly by the action of the weight of the counterweighted lever $e^1$ against the guiding curve $a^4$ of a disk cam $A^3$ rigidly fixed on the shaft $A^1$.

If the driving shaft D be rotated once through an angle of 360 degrees the worm connected to it rotates by the same amount. The rotation which is hereby imparted to the worm wheel A is also taken up by the disk cam $A^3$ rigidly secured thereto. If the guiding curve $a^4$ runs parallel with the central plane of the worm wheel A at the point just where the arm $e^2$ of the counterweighted lever $e^1$ $e^2$ is situated, no rotation of the screw spindle E takes place and consequently no longitudinal movement of the worm B. With any other shape of the guiding curve $a^4$ however the engagement of the guiding curve $a^4$ with the lever $e^2$ causes the screw spindle to rotate and thus moves the screw threaded sleeve F so that the worm B which takes part in the longitudinal movements of this part of the gear has in addition to the aforesaid rotation an axial movement also imparted to it.

The angle through which the worm wheel A is rotated when the driving shaft D makes a complete revolution, is equal to the sum of two angles of which one depends only on the rotation and the other only on the longitudinal movement of the worm. The size of the first angle is measured by the length which the pitch of the teeth $a^2$ has at the point of contact and the size of the second angle is determined by the shape of the guiding curve $a^4$. If the inequalities of the pitch have been previously measured along the periphery of the teeth $a^2$, it is possible at once by suitable determination of the shape of the guiding curve $a^4$ to insure that these inequalities can be compensated by the second partial amount of the angle of rotation of the worm wheel dependent on the longitudinal movement of the worm. A worm gear is thus obtained the worm wheel of which always rotates through the same angle with great accuracy when the angles of rotation of the driving shaft of the worm are the same.

Claims:

1. Worm gearing having means for preventing irregularities in the angular movement of the worm-wheel, comprising means for varying the movement of the worm to compensate for inequalities in pitch of the gear teeth.

2. Worm gearing having the worm axially adjustable and means for automatically adjusting the worm to compensate for inequalities of pitch of the gear teeth.

3. Worm gearing having the worm axially adjustable, means for adjusting the worm axially, and means for controlling the axial adjustment comprising a member whose actuating element corresponds to the inequalities of pitch of the gear teeth.

4. Worm gearing having means for adjusting the worm through an angle with relation to the worm-wheel axis, and controlling means for such adjusting means, having its effective part constructed to rigidly control said adjusting means in accordance with inequalities in the gear teeth.

5. Worm gearing having its worm adjustable through an angle with reference to the worm-wheel axis, and controlling means for adjusting the worm comprising a cam shaped to correspond with inequalities of the gear-teeth.

6. Worm gearing having an axially movable worm, an arm for adjusting said worm, a screw for operating said arm, a lever for rotating said screw and a cam having operative relation to the worm gear and said lever and shaped to correspond with inequalities of the gearing.

The foregoing specification signed at Essen, Germany, this 12th day of June, 1920.

WILHELM POHL.

In presence of—
HANS GOTTSMANN,
JOSEF OLBERTZ.